United States Patent
An et al.

(10) Patent No.: US 11,394,896 B2
(45) Date of Patent: Jul. 19, 2022

(54) APPARATUS AND METHOD FOR OBTAINING IMAGE

(71) Applicant: LG ELECTRONICS INC., Seoul (KR)

(72) Inventors: Jaehyun An, Seoul (KR); Jiwon Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 252 days.

(21) Appl. No.: 16/869,051

(22) Filed: May 7, 2020

(65) Prior Publication Data

US 2021/0195117 A1    Jun. 24, 2021

(30) Foreign Application Priority Data

Dec. 18, 2019    (KR) .......................... 10-2019-0169392

(51) Int. Cl.
| | |
|---|---|
| *H04N 5/243* | (2006.01) |
| *H04N 5/235* | (2006.01) |
| *H04N 5/225* | (2006.01) |
| *H04N 5/33* | (2006.01) |
| *G06T 5/00* | (2006.01) |
| *G06T 3/40* | (2006.01) |
| *G06F 17/18* | (2006.01) |
| *G06T 5/50* | (2006.01) |

(52) U.S. Cl.
CPC ............. *H04N 5/243* (2013.01); *G06F 17/18* (2013.01); *G06T 3/4007* (2013.01); *G06T 5/001* (2013.01); *G06T 5/50* (2013.01); *H04N 5/2256* (2013.01); *H04N 5/2354* (2013.01); *H04N 5/33* (2013.01); *G06T 2207/10024* (2013.01); *G06T 2207/10048* (2013.01); *G06T 2207/20216* (2013.01); *G06T 2207/20224* (2013.01)

(58) Field of Classification Search
None
See application file for complete search history.

(56) References Cited

U.S. PATENT DOCUMENTS

| | | | |
|---|---|---|---|
| 2015/0245767 A1* | 9/2015 | Northcott | A61B 3/1216 351/206 |
| 2020/0228689 A1* | 7/2020 | Kim | H04N 9/04553 |

* cited by examiner

*Primary Examiner* — Quan Pham
(74) *Attorney, Agent, or Firm* — Lee Hong Degerman Kang & Waimey

(57) ABSTRACT

Provided is a method for obtaining an image includes: obtaining first image data by photographing a first color by means of the image sensor while an IR illumination is turned on; obtaining second image data by photographing the first color by means of the image sensor while an IR illumination is turned off; extracting, from the first image data, first row data obtained from a first pixel of the image sensor; extracting, from the first image data, IR row data corresponding to an IR component of the first pixel; and generating correction data of the first pixel based on a difference between the first row data and the IR row data. According to an embodiment, the artificial intelligence (AI) module may be related to unmanned aerial vehicles (UAVs), robots, augmented reality (AR) devices, virtual reality (VR) devices, and 5G service-related devices.

15 Claims, 11 Drawing Sheets

[FIG. 1]
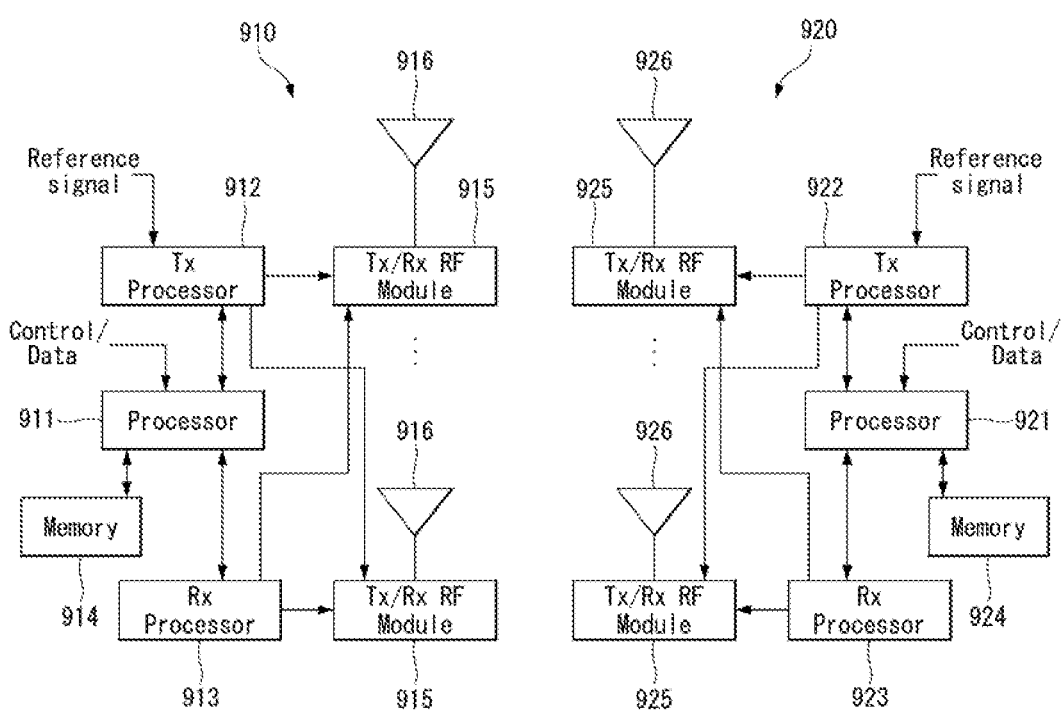

[FIG. 2]
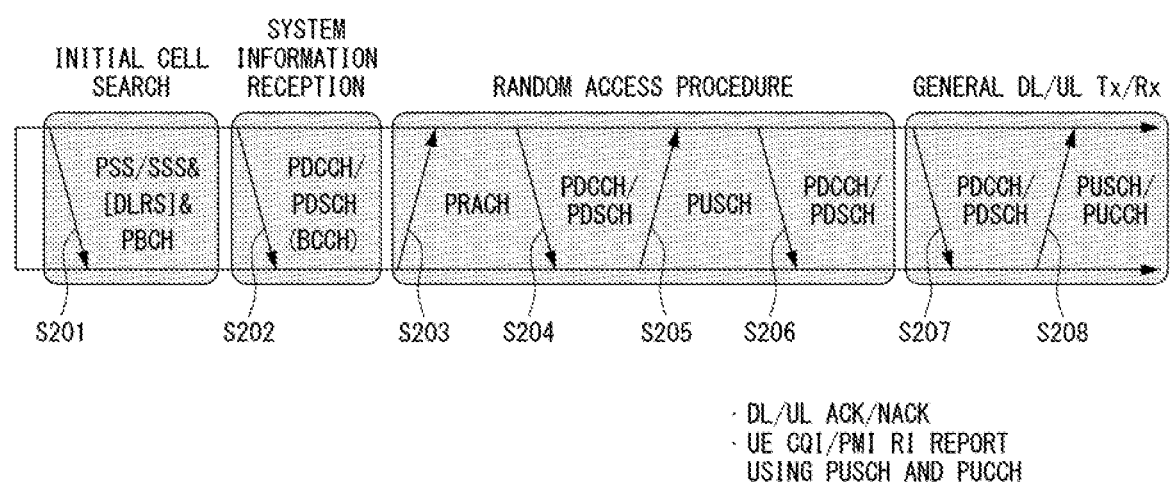

[FIG. 3]
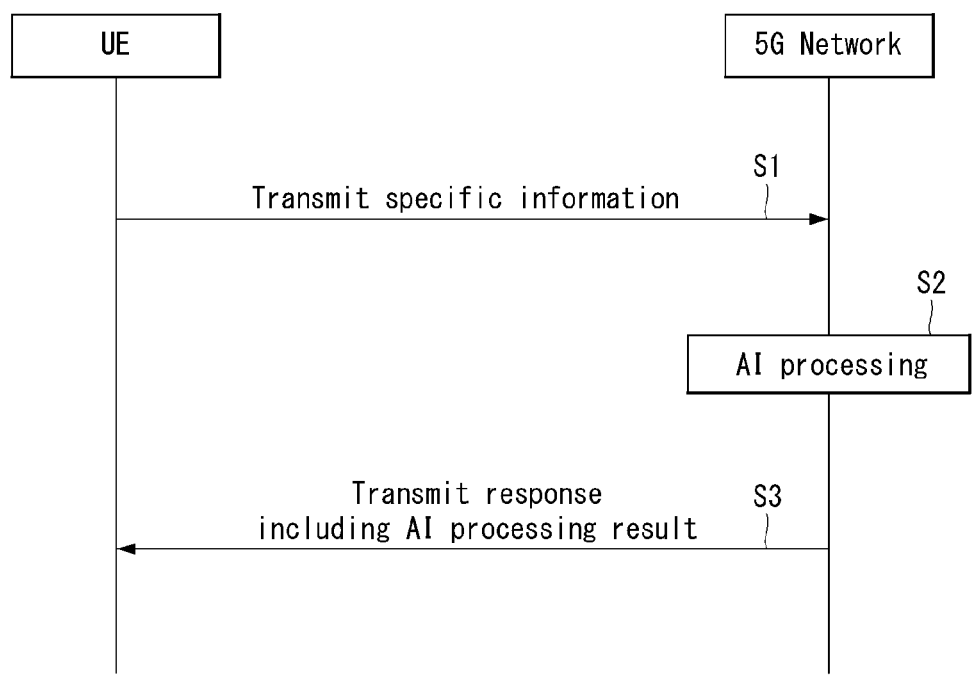

[FIG. 4]
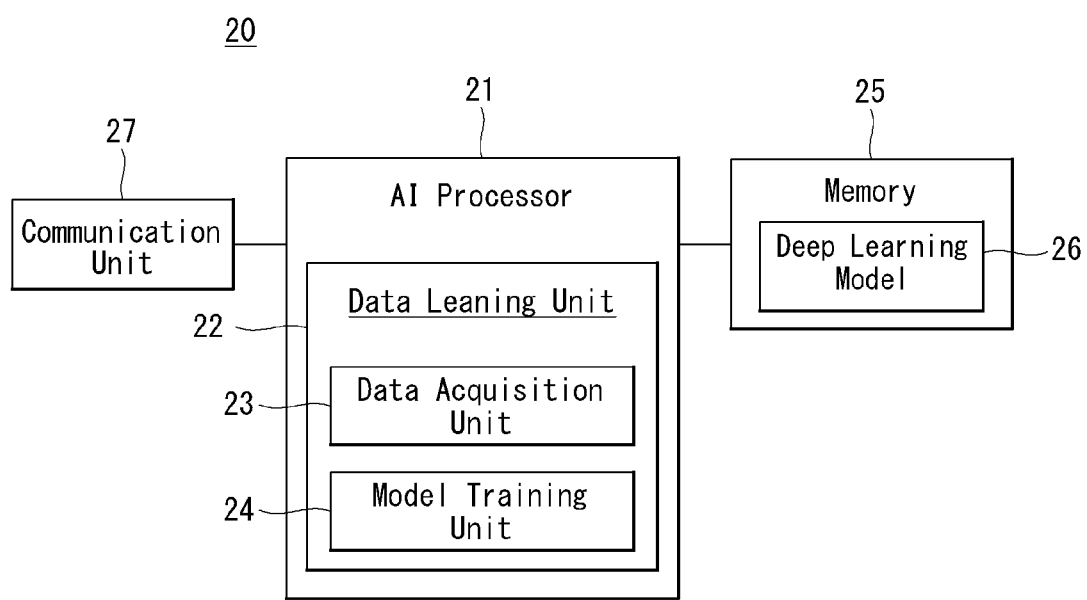

[FIG. 5]
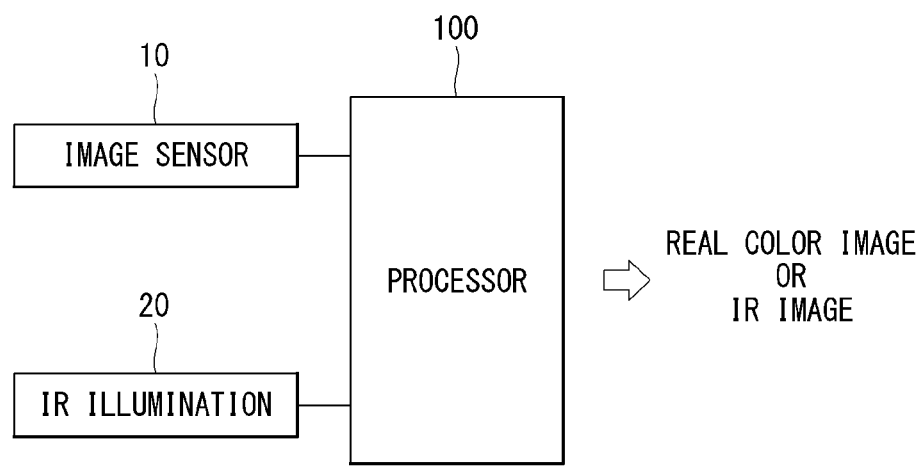

[FIG. 6]
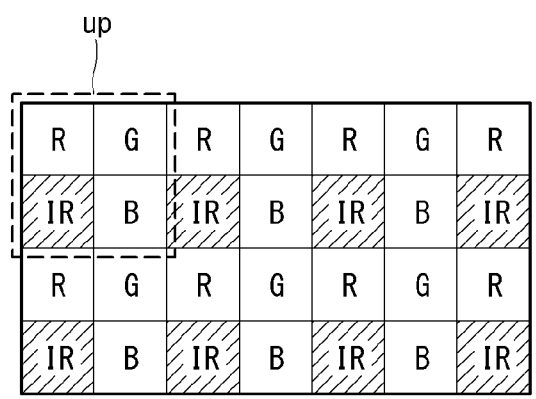

[FIG. 7]
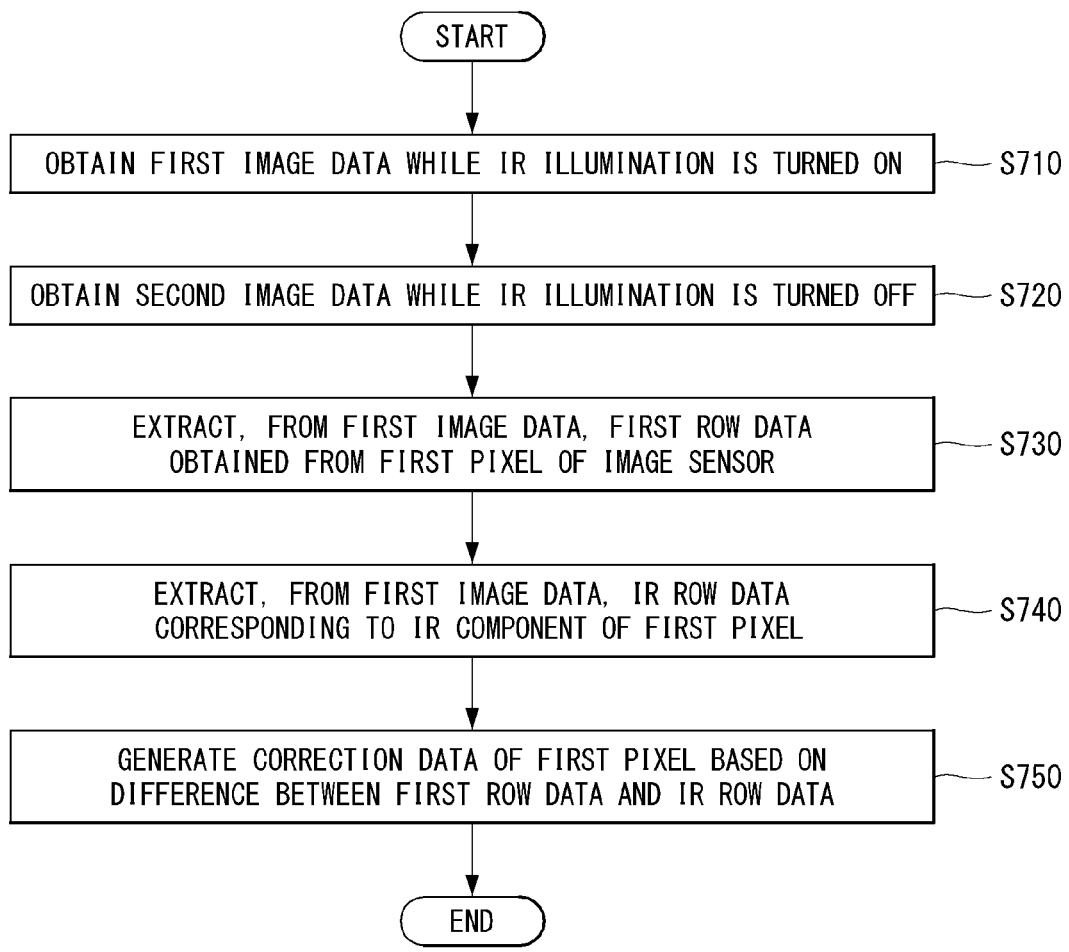

[FIG. 8]
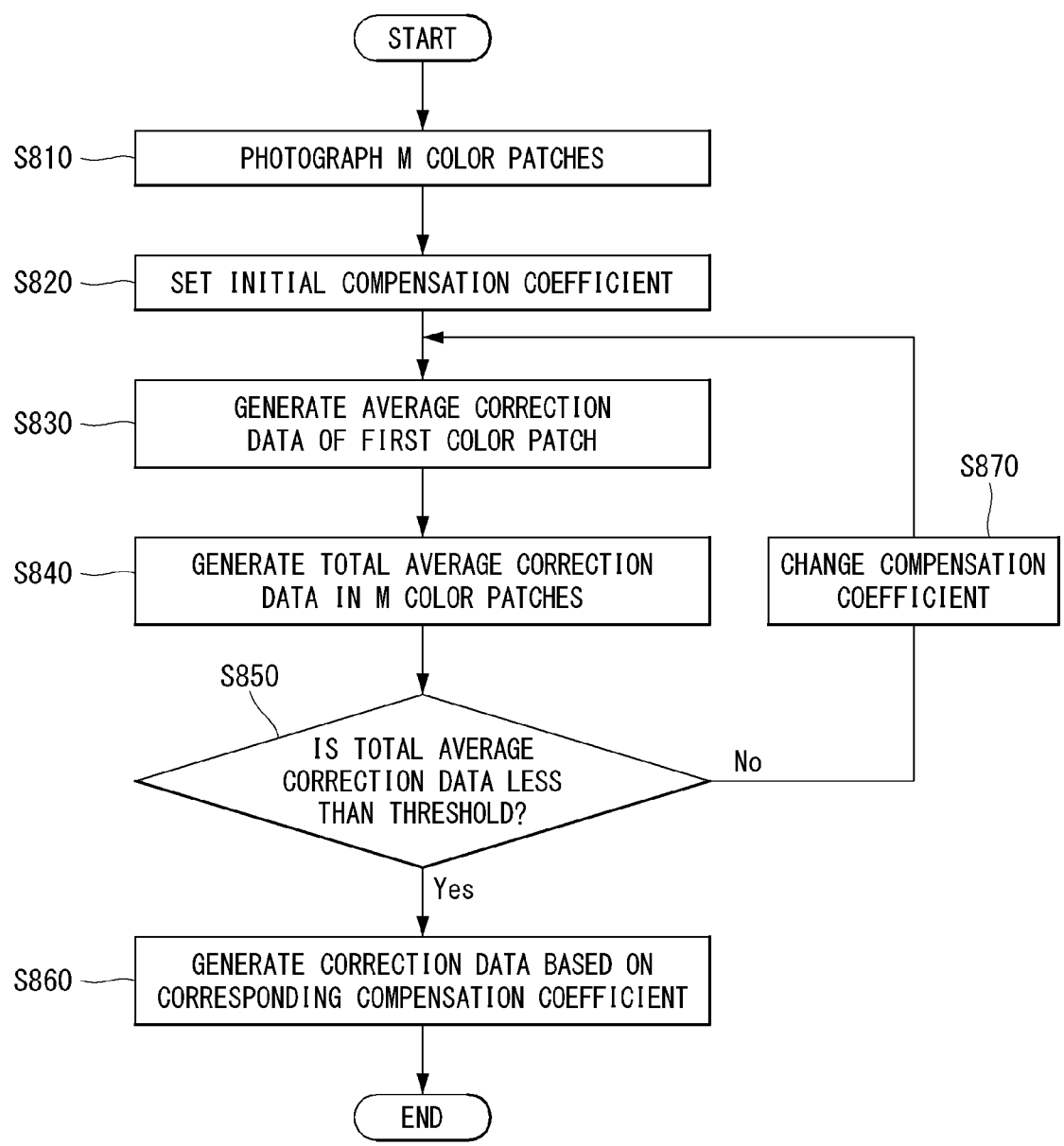

[FIG. 9]

| C1 | C2 | C3 | C4 | C5 | C6 | C7 | C8 |
|----|----|----|----|----|----|----|----|
| C9 |    |    |    |    |    |    |    |
|    |    |    |    |    |    |    |    |
|    |    |    |    |    |    |    | C24 |

[FIG. 10]
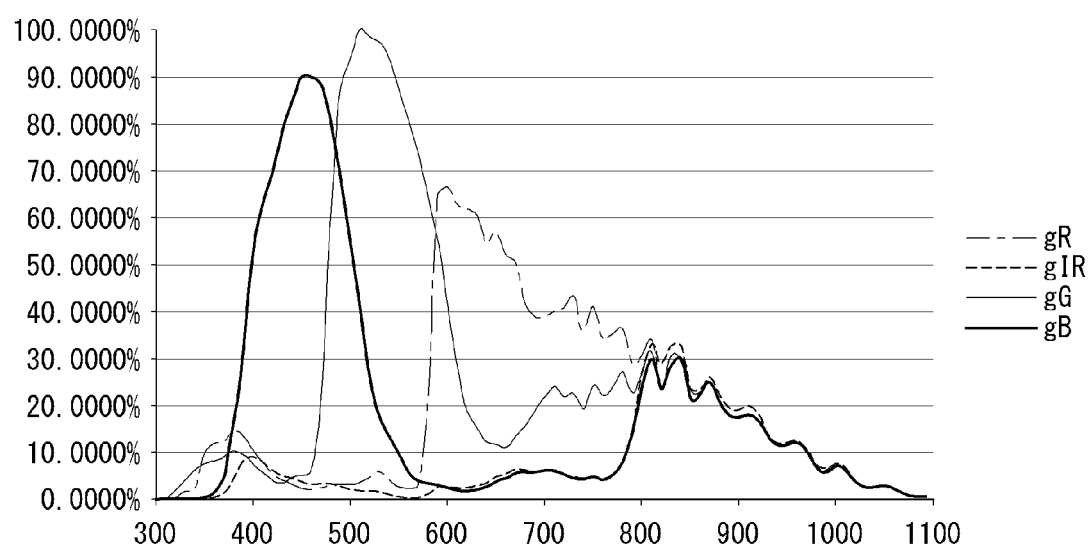

[FIG. 11]
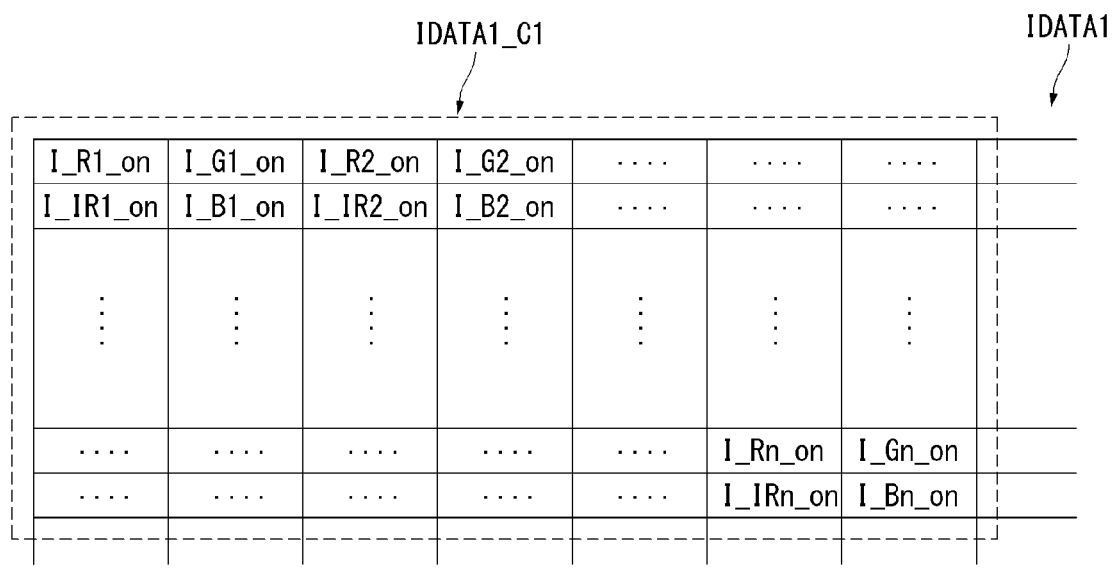

APPARATUS AND METHOD FOR OBTAINING IMAGE

CROSS-REFERENCE TO RELATED APPLICATIONS

Pursuant to 35 U.S.C. § 119(a), this application claims the benefit of earlier filing date and right of priority to Korean Patent Application No. 10-2019-0169392, filed on Dec. 18, 2019, the contents of which are hereby incorporated by reference herein in its entirety.

BACKGROUND OF THE INVENTION

Field of the Invention

The present disclosure relates to an apparatus and a method for processing image data, and particularly, to an apparatus and a method for processing image data, which may obtain a real color from an RGB-IR sensor.

Related Art

An RGB-IR image sensor includes sensors for photographing three primary colors of red, green, and blue and an infrared ray and obtains a color image constituted by three primary colors and an infrared (hereinafter, referred to as IR) image.

A general RGB-IR image sensor may cut off an IR component by using an IR cut filter in the process of obtaining the color image. The IR cut filter easily cuts off IR, but there is a disadvantage in that cost of an overall image sensor increases.

In recent years, methods that may obtain a real color image without the IR component while simplifying manufacturing cost have been studied.

SUMMARY OF THE INVENTION

In an aspect, provided is a method for obtaining an image which uses an image sensor including an infrared pixel and three R,G,B color pixels, including: obtaining first image data by photographing a first color by means of the image sensor while an IR illumination is turned on; obtaining second image data by photographing the first color by means of the image sensor while an IR illumination is turned off; extracting, from the first image data, first row data obtained from a first pixel of the image sensor; extracting, from the first image data, IR row data corresponding to an IR component of the first pixel; and generating correction data of the first pixel based on a difference between the first row data and the IR row data. In the generating of the correction data, second row data obtained from the first pixel is extracted from the second image data and the correction data is generated so that a correction value which is in proportion to a deviation between the second row data and the correction data is less than a predetermined reference value.

The first pixel may be any one of the R,G,B color pixels.

The obtaining of the IR row data of the first pixel may include interpolating IR data of two or more IR pixels adjacent to the first pixel.

The generating of the correction data of the first pixel may include subtracting, from the first row data, a value corresponding to a product between a compensation coefficient and the second row data.

The setting of the compensation coefficient may include setting an i (i is a natural number)-th compensation coefficient, generating i-th correction data by subtracting, from the first row data, a value corresponding to a product between the i-th compensation coefficient and the second row data, and setting the i-th compensation coefficient as the compensation coefficient based on a fact that an i-th correction value which is in proportion to a deviation between the second row data and the i-th correction data is less than the reference value.

The obtaining of the first and second image data may further include obtaining first and second image data for second to M (M is a natural number of 3 or more)-th colors.

The setting of the compensation coefficient may include calculating an i-th correction value of each of n (n is a natural number) pixels of the first color, calculating an i-th average correction value for the n correction values, obtaining an i-th total average correction value by calculating an average value for M i-th average correction values for the M colors, respectively, and determining the i-th compensation coefficient as the compensation coefficient based on a fact that the i-th total average correction value is less than a predetermined threshold.

The first compensation coefficient may be set to a ratio of an IR light receiving amount received by the first pixel which is one of R, G, and B pixels to an IR light receiving amount received by the IR pixel.

In another aspect, provided is an apparatus for obtaining an image, including: an image sensor including R,G,B color pixels and an infrared pixel; an IR illumination irradiating infrared light; and a processor obtaining first image data by photographing a first color by means of the image sensor while the IR illumination is turned on, extracting, from the first image data, first row data obtained from a first pixel of the image sensor and IR row data corresponding to an IR component of the first pixel, and generating correction data of the first pixel based on a difference between the row data and the IR row data.

The processor may extract second row data obtained from the first pixel from the second image data and generate the correction data so that a correction value which is in proportion to a deviation between the second row data and the correction data is less than a predetermined reference value.

The processor may obtain the IR row data of the first pixel by interpolating IR data of two or more IR pixels adjacent to the first pixel.

The processor may generate the correction data of the first pixel by subtracting, from the first row data, a value corresponding to a product between a correction coefficient and the second row data.

The processor may set an i (i is a natural number)-th compensation coefficient and generate i-th correction data by subtracting, from the first row data, a value corresponding to a product between the i-th compensation coefficient and the second row data, and set the i-th compensation coefficient as the compensation coefficient based on a fact that an i-th correction value which is in proportion to a deviation between the second row data and the i-th correction data is less than the reference value.

The processor may further obtain first and second image data for second to M (M is a natural number of 3 or more)-th colors.

The processor may calculate an i-th correction value of each of n (n is a natural number) pixels of the first color, calculates an i-th average correction value for the n correction values, obtain an i-th total average correction value by calculating an average value for M i-th average correction values for the M colors, respectively, and determine the i-th compensation coefficient as the compensation coefficient based on a fact that the i-th total average correction value is less than a predetermined threshold.

The processor may set the first compensation coefficient to a ratio of an IR light receiving amount received by the first pixel which is one of R, G, and B pixels to an IR light receiving amount received by the IR pixel.

The first pixel may be any one of the R,G,B color pixels.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein:

FIG. 1 is a block diagram illustrating a configuration of a wireless communication system to which methods proposed herein may apply;

FIG. 2 is a view illustrating an example method of transmitting/receiving signals in a wireless communication system;

FIG. 3 is a view illustrating example basic operations of a user terminal and a 5G network in a 5G communication system;

FIG. 4 is a block diagram illustrating an AI device according to an embodiment of the present disclosure;

FIG. 5 is a view illustrating an apparatus for obtaining an image according to an embodiment of the present disclosure;

FIG. 6 is a view illustrating an image sensor according to an embodiment of the present disclosure;

FIG. 7 is a view illustrating a method for obtaining an image according to an embodiment of the present disclosure;

FIG. 8 is a view illustrating an embodiment of setting a compensation coefficient;

FIG. 9 is a view illustrating an example of a plurality of color patches;

FIG. 10 is a view illustrating a light receiving rate which an image sensor may sense for each frequency domain; and FIG. 11 is a view illustrating first image data.

DESCRIPTION OF EXEMPLARY EMBODIMENTS

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present disclosure would unnecessarily obscure the gist of the present disclosure, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

Hereinafter, 5G communication (5th generation mobile communication) required by an apparatus requiring AI processed information and/or an AI processor will be described through paragraphs A through G.

A. Example of Block Diagram of UE and 5G Network

FIG. 1 is a block diagram of a wireless communication system to which methods proposed in the disclosure are applicable.

Referring to FIG. 1, a device (AI device) including an AI module is defined as a first communication device (910 of FIG. 1), and a processor 911 can perform detailed AI operation.

A 5G network including another device (AI server) communicating with the AI device is defined as a second communication device (920 of FIG. 1), and a processor 921 can perform detailed AI operations.

The 5G network may be represented as the first communication device and the AI device may be represented as the second communication device.

For example, the first communication device or the second communication device may be a base station, a network node, a transmission terminal, a reception terminal, a wireless device, a wireless communication device, an autonomous device, or the like.

For example, the first communication device or the second communication device may be a base station, a network node, a transmission terminal, a reception terminal, a wireless device, a wireless communication device, a vehicle, a vehicle having an autonomous function, a connected car, a drone (Unmanned Aerial Vehicle, UAV), and AI (Artificial Intelligence) module, a robot, an AR (Augmented Reality) device, a VR (Virtual Reality) device, an MR (Mixed Reality) device, a hologram device, a public safety device, an MTC device, an IoT device, a medical device, a Fin Tech device (or financial device), a security device, a climate/environment device, a device associated with 5G services, or other devices associated with the fourth industrial revolution field.

For example, a terminal or user equipment (UE) may include a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. For example, the drone may be a flying object that flies by wireless control signals without a person therein. For example, the VR device may include a device that implements objects or backgrounds of a virtual world. For example, the AR device may include a device that connects and implements objects or background of a virtual world to objects, backgrounds, or the like of a real world. For example, the MR device may include a device that unites and implements objects or background of a virtual world to objects, backgrounds, or the like of a real world. For example, the hologram device may include a device that implements 360-degree 3D images by recording and playing 3D information using the interference phenomenon of light that is generated by two lasers meeting each other which is called holography. For example, the public safety device may include an image repeater or an imaging device that can be worn on the body of a user. For example, the MTC device and the IoT device may be devices that do not require direct interference or operation by a person. For example, the MTC device and the IoT device may include a smart meter, a bending machine, a thermometer, a smart bulb, a door lock, various sensors, or the like. For example, the medical device may be a device that is used to diagnose, treat, attenuate, remove, or prevent diseases. For example, the medical device may be a device that is used to diagnose, treat, attenuate, or correct injuries or disorders. For example, the medial device may be a device that is used to examine, replace, or change structures or functions. For example, the medical device may be a device that is used to control pregnancy. For example, the medical device may include a device for medical treatment, a device for operations, a device for (external) diagnose, a hearing aid, an operation device, or the like. For example, the security device may be a device that is installed to prevent a danger that is likely to occur and to keep safety. For example, the security device may be a camera, a CCTV, a recorder, a black box, or the like. For example, the Fin Tech device may be a device that can provide financial services such as mobile payment.

Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

FIG. 2 is a diagram showing an example of a signal transmission/reception method in a wireless communication system.

Referring to FIG. 2, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and acquire information such as a cell ID. In LTE and NR systems, the P-SCH and S-SCH are respectively called a primary synchronization signal (PSS) and a secondary synchronization signal (SSS). After initial cell search, the UE can acquire broadcast information in the cell by receiving a physical broadcast channel (PBCH) from the BS. Further, the UE can receive a downlink reference signal (DL RS) in the initial cell search step to check a downlink channel state. After initial cell search, the UE can acquire more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE acquires time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/acquired through an SSS of the cell, and information on the cell ID among 336 cell ID groups is provided/acquired through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure can be used for network initial access, handover, and UE-triggered UL data transmission. A UE can acquire UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

- A UE receives a CSI-ResourceConfig IE including CSI-SSB-ResourceSetList for SSB resources used for BM from a BS. The RRC parameter "csi-SSB-ResourceSetList" represents a list of SSB resources used for beam management and report in one resource set. Here, an SSB resource set can be set as {SSBx1, SSBx2, SSBx3, SSBx4, ... }. An SSB index can be defined in the range of 0 to 63.
- The UE receives the signals on SSB resources from the BS on the basis of the CSI-SSB-ResourceSetList.
- When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

The UE receives an NZP CSI-RS resource set IE including an RRC parameter with respect to 'repetition' from a BS through RRC signaling. Here, the RRC parameter 'repetition' is set to 'ON'.

The UE repeatedly receives signals on resources in a CSI-RS resource set in which the RRC parameter 'repetition' is set to 'ON' in different OFDM symbols through the same Tx beam (or DL spatial domain transmission filters) of the BS.

The UE determines an RX beam thereof

The UE skips a CSI report. That is, the UE can skip a CSI report when the RRC parameter 'repetition' is set to 'ON'.

Next, the Tx beam determination procedure of a BS will be described.

A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.

The UE receives signals on resources in a CSI-RS resource set in which the RRC parameter 'repetition' is set to 'OFF' in different DL spatial domain transmission filters of the BS.

The UE selects (or determines) a best beam.

The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

A UE receives RRC signaling (e.g., SRS-Config IE) including a (RRC parameter) purpose parameter set to 'beam management" from a BS. The SRS-Config IE is used to set SRS transmission. The SRS-Config IE includes a list of SRS-Resources and a list of SRS-ResourceSets. Each SRS resource set refers to a set of SRS-resources.

The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.

When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by servingCellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation Between Autonomous Vehicles Using 5G Communication

FIG. 3 shows an example of basic operations of an autonomous vehicle and a 5G network in a 5G communication system.

The autonomous vehicle transmits specific information to the 5G network (S1). The specific information may include autonomous driving related information. In addition, the 5G network can determine whether to remotely control the vehicle (S2). Here, the 5G network may include a server or a module which performs remote control related to autonomous driving. In addition, the 5G network can transmit information (or signal) related to remote control to the autonomous vehicle (S3).

G. Applied Operations Between Autonomous Vehicle and 5G Network in 5G Communication System Hereinafter, the operation of an autonomous vehicle using 5G communication will be described in more detail with reference to wireless communication technology (BM procedure, URLLC, mMTC, etc.) described in FIGS. 1 and 2.

First, a basic procedure of an applied operation to which a method proposed by the present disclosure which will be described later and eMBB of 5G communication are applied will be described.

As in steps S1 and S3 of FIG. 3, the autonomous vehicle performs an initial access procedure and a random access procedure with the 5G network prior to step S1 of FIG. 3 in order to transmit/receive signals, information and the like to/from the 5G network.

More specifically, the autonomous vehicle performs an initial access procedure with the 5G network on the basis of an SSB in order to acquire DL synchronization and system information. A beam management (BM) procedure and a beam failure recovery procedure may be added in the initial access procedure, and quasi-co-location (QCL) relation may be added in a process in which the autonomous vehicle receives a signal from the 5G network.

In addition, the autonomous vehicle performs a random access procedure with the 5G network for UL synchronization acquisition and/or UL transmission. The 5G network can transmit, to the autonomous vehicle, a UL grant for scheduling transmission of specific information. Accordingly, the autonomous vehicle transmits the specific information to the 5G network on the basis of the UL grant. In addition, the 5G network transmits, to the autonomous vehicle, a DL grant for scheduling transmission of 5G processing results with respect to the specific information. Accordingly, the 5G network can transmit, to the autonomous vehicle, information (or a signal) related to remote control on the basis of the DL grant.

Next, a basic procedure of an applied operation to which a method proposed by the present disclosure which will be described later and URLLC of 5G communication are applied will be described.

As described above, an autonomous vehicle can receive DownlinkPreemption IE from the 5G network after the autonomous vehicle performs an initial access procedure and/or a random access procedure with the 5G network. Then, the autonomous vehicle receives DCI format 2_1 including a preemption indication from the 5G network on the basis of DownlinkPreemption IE. The autonomous vehicle does not perform (or expect or assume) reception of eMBB data in resources (PRBs and/or OFDM symbols) indicated by the preemption indication. Thereafter, when the autonomous vehicle needs to transmit specific information, the autonomous vehicle can receive a UL grant from the 5G network.

Next, a basic procedure of an applied operation to which a method proposed by the present disclosure which will be described later and mMTC of 5G communication are applied will be described.

Description will focus on parts in the steps of FIG. 3 which are changed according to application of mMTC.

In step S1 of FIG. 3, the autonomous vehicle receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the autonomous vehicle transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

The above-described 5G communication technology can be combined with methods proposed in the present disclosure which will be described later and applied or can complement the methods proposed in the present disclosure to make technical features of the methods concrete and clear.

FIG. 4 is a block diagram illustrating an AI device according to an embodiment of the present disclosure.

Referring to FIG. 4, an AI device 20 may include an electronic device including an AI module capable of AI processing or a server including an AI module. Further, the AI device 20 may be provided to be included in at least a partial component of the device disclosed in the present disclosure to perform at least some of AI processing together.

The AI processing may include all operations related to a control of the device disclosed in the present disclosure. For example, when the device is an autonomous vehicle, the autonomous vehicle AI-processes sensing data or driver data to perform processing/determination and a control signal generating operation. Further, for example, when the device is, for example, the autonomous vehicle, the device AI-processes data obtained through an interaction with another electronic device provided in the vehicle to perform autonomous driving control.

The AI device 20 may include an AI processor 21, a memory 25, and/or a transceiver 27.

The AI device 20 as a computing device capable of learning a neural network may be implemented as various electronic devices including a server, a desktop PC, a notebook PC, a tablet PC, etc.

The AI processor 21 may train the ANN based on the program stored in the memory 25. In particular, the AI processor 21 may train a neural network for recognizing relevant data of the washer 10. The neural network for recognizing the relevant data of the washer 10 may be designed to mimic the human brain on the computer and may include a plurality of weighted network nodes which mimic the neurons of the human neural network. The plurality of network nodes can transmit and receive data in accordance with each connection relationship to simulate the synaptic activity of neurons in which neurons transmit and receive signals through synapses. Here, the neural network may include a deep learning model developed from a neural network model. In the deep learning model, a plurality of network nodes is positioned in different layers and can transmit and receive data in accordance with a convolution connection relationship. The neural network, for example, includes various deep learning techniques such as deep neural networks (DNN), convolutional deep neural networks (CNN), recurrent neural networks (RNN), a restricted boltzmann machine (RBM), deep belief networks (DBN), and a deep Q-network, and can be applied to fields such as computer vision, voice recognition, natural language processing, and voice/signal processing.

Meanwhile, a processor that performs the functions described above may be a general purpose processor (e.g., a CPU), but may be an AI-only processor (e.g., a GPU) for artificial intelligence learning.

The memory 25 can store various programs and data for the operation of the AI device 20. The memory 25 may be a nonvolatile memory, a volatile memory, a flash-memory, a hard disk drive (HDD), a solid state drive (SDD), or the like. The memory 25 is accessed by the AI processor 21 and reading-out/recording/correcting/deleting/updating, etc. of data by the AI processor 21 can be performed. Further, the memory 25 can store a neural network model (e.g., a deep learning model 26) generated through a learning algorithm for data classification/recognition according to an embodiment of the present disclosure.

Meanwhile, the AI processor 21 may include a data learning unit 22 that learns a neural network for data classification/recognition. The data learning unit 22 can learn references about what learning data are used and how to classify and recognize data using the learning data in order to determine data classification/recognition. The data learning unit 22 can learn a deep learning model by acquiring learning data to be used for learning and by applying the acquired learning data to the deep learning model.

The data learning unit 22 may be manufactured in the type of at least one hardware chip and mounted on the AI device 20. For example, the data learning unit 22 may be manufactured in a hardware chip type only for artificial intelligence, and may be manufactured as a part of a general purpose processor (CPU) or a graphics processing unit (GPU) and mounted on the AI device 20. Further, the data learning unit 22 may be implemented as a software module. When the data leaning unit 22 is implemented as a software module (or a program module including instructions), the software module may be stored in non-transitory computer readable media that can be read through a computer. In this case, at least one software module may be provided by an OS (operating system) or may be provided by an application.

The data learning unit 22 may include a learning data acquiring unit 23 and a model learning unit 24.

The learning data acquiring unit 23 can acquire learning data required for a neural network model for classifying and recognizing data. For example, the learning data acquiring unit 23 can acquire, as learning data, vehicle data and/or sample data to be input to a neural network model.

The model learning unit 24 can perform learning such that a neural network model has a determination reference about how to classify predetermined data, using the acquired learning data. In this case, the model learning unit 24 can train a neural network model through supervised learning that uses at least some of learning data as a determination reference. Alternatively, the model learning data 24 can train a neural network model through unsupervised learning that finds out a determination reference by performing learning by itself using learning data without supervision. Further, the model learning unit 24 can train a neural network model through reinforcement learning using feedback about whether the result of situation determination according to learning is correct. Further, the model learning unit 24 can train a neural network model using a learning algorithm including error back-propagation or gradient decent.

When a neural network model is learned, the model learning unit 24 can store the learned neural network model in the memory. The model learning unit 24 may store the learned neural network model in the memory of a server connected with the AI device 20 through a wire or wireless network.

The data learning unit 22 may further include a learning data preprocessor (not shown) and a learning data selector (not shown) to improve the analysis result of a recognition model or reduce resources or time for generating a recognition model.

The learning data preprocessor can preprocess acquired data such that the acquired data can be used in learning for situation determination. For example, the learning data preprocessor can process acquired data in a predetermined format such that the model learning unit 24 can use learning data acquired for learning for image recognition.

Further, the learning data selector can select data for learning from the learning data acquired by the learning data acquiring unit 23 or the learning data preprocessed by the preprocessor. The selected learning data can be provided to the model learning unit 24. For example, the learning data selector can select only data for objects included in a specific area as learning data by detecting the specific area in an image acquired through a camera of a vehicle.

Further, the data learning unit 22 may further include a model estimator (not shown) to improve the analysis result of a neural network model.

The model estimator inputs estimation data to a neural network model, and when an analysis result output from the estimation data does not satisfy a predetermined reference, it can make the model learning unit 22 perform learning again. In this case, the estimation data may be data defined in advance for estimating a recognition model. For example, when the number or ratio of estimation data with an incorrect analysis result of the analysis result of a recognition model learned with respect to estimation data exceeds a predetermined threshold, the model estimator can estimate that a predetermined reference is not satisfied.

The communication unit 27 can transmit the AI processing result by the AI processor 21 to an external electronic device.

Here, the external electronic device may be defined as an autonomous vehicle. Further, the AI device 20 may be defined as another vehicle or a 5G network that communicates with the autonomous vehicle. Meanwhile, the AI device 20 may be implemented by being functionally embedded in an autonomous module included in a vehicle. Further, the 5G network may include a server or a module that performs control related to autonomous driving.

Meanwhile, the AI device 20 shown in FIG. 4 was functionally separately described into the AI processor 21, the memory 25, the communication unit 27, etc., but it should be noted that the aforementioned components may be integrated in one module and referred to as an AI module.

FIG. 5 is a view illustrating an apparatus for obtaining an image according to an embodiment of the present disclosure.

Referring to FIG. 5, the apparatus for obtaining an image according to an embodiment of the present disclosure includes an image sensor 10, an IR illumination 20, and a processor 30.

The image sensor 10 includes multiple unit pixels UP as illustrated in FIG. 6. Each of the unit pixels UP includes RGB pixels and an infrared pixel (hereinafter, referred to as IR pixel) IR and the RGB pixels include red pixels R, green pixels G, and green pixels B. The RGB pixels receive light in a visible light band and cause current and voltage changes according to the received visible light. The IR pixels receive light in an infrared ray band and cause the current and voltage changes according to the received visible ray.

The IR illumination 20 emits infrared light to reinforce an infrared light amount reflected from a subject in the process of generating an IR image.

The processor 30 controls overall operations of the image sensor 10 and the IR illumination 20 and generates the real color image or the IR image based on an image obtained from the image sensor 10. The processor 30 performs a procedure of removing an IR component from an image which the RGB pixels of the image sensor 10 obtain in order to obtain the real color image. In particular, the processor 30 effectively removes the IR component to obtain a color image close to an object recognized by a human eye.

As such, since the apparatus for obtaining an image according to an embodiment of the present disclosure may remove the IR component from image data by using an image processing method performed by the processor 30, the apparatus may obtain a color image close to a real one without an IR cut filter.

FIG. 7 is a view illustrating a method for obtaining an image according to an embodiment of the present disclosure. The method for obtaining an image to be described below includes a procedure in which the processor 30 performs a predetermined algorithm while controlling the image sensor 10 and the IR illumination 20 as a whole.

Referring to FIG. 7, in the method for obtaining an image according to an embodiment of the present disclosure, in a first step (S710), first image data is obtained. The first image data refers to those obtained by photographing a patch having a predetermined specific color by using the image sensor 10 while the IR illumination 20 is turned on.

In a second step (S720), second image data is obtained. The second image data refers to those obtained by photographing a patch having a specific color by using the image sensor 10 while the IR illumination 20 is turned off.

In a third step (S730), first row data I_R_on of a first pixel is extracted from the first image data. The first pixel refers to any one of R, G, and B pixels of the image sensor 10. The first row data I_R_on of the first pixel refers to image data obtained from the first pixel. In the present disclosure, "I_R_on" refers to first row data of the R pixel, "I_G_on" refers to first row data of the G pixel, and "I_B_on" refers to first row data of the B pixel.

In a fourth step (S740), IR row data I_IR_on for the first pixel is extracted from the first image data.

The IR row data I_IR_on of the first pixel refers to an IR component including image data obtained through the first pixel. Since the first pixel is one of the R, G, and B pixels, the IR component of the first pixel is generated by interpolating the image data obtained from adjacent IR pixels. An interpolation method may adopt any known technique.

In a fifth step (S750), correction data Iout_R of the first pixel is generated based on a difference between the first row data I_R_on and the IR row data I_IR_on. The correction data Iout_R may be obtained by subtracting the IR row data I_IR_on which is in proportion to a compensation coefficient size from the first row data I_R_on. The correction data Iout_R is used as color image data of the first pixel.

The correction data Iout_R varies depending on a compensation coefficient. The correction data Iout_R should not ideally have the IR component, and as a result, when ideal correction data Iout_R does not have the IR component, the ideal correction data has the same size as second row data I_R_off obtained while turning off the IR illumination 20. Accordingly, the compensation coefficient is preferably set to a size to make the correction data Iout_R close to the second row data I_R_off.

Hereinafter, a detailed embodiment of setting the compensation coefficient will be described below.

FIG. 8 is a view illustrating an embodiment of setting a compensation coefficient.

Referring to FIG. 8, a method for setting the compensation coefficient for the R pixel will be described below.

Figure 9:
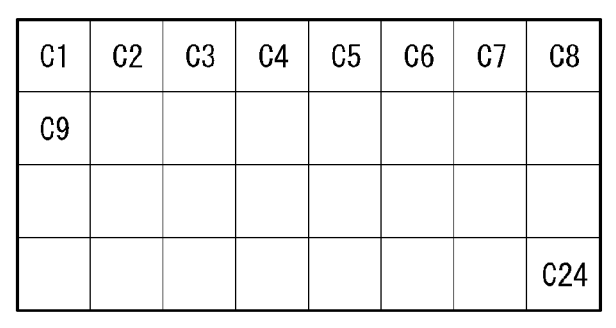

In a first step (S810), a plurality of color patches is photographed by using the image sensor 10. FIG. 9 which is a view illustrating an example of a plurality of color patches may use a Macbeth Color Checker (hereinafter, referred to as MCC) chart. The MCC chart may include a first patch C to a 24-th patch C24 and each of the first to 24-th patches C1 to C24 is expressed by one predetermined standard color.

In a second step (S820), an initial compensation coefficient is set.

Based on FIG. 10, a method for setting the initial compensation coefficient will be described below.

FIG. 10 is a view illustrating a light receiving rate which an image sensor may sense for each frequency domain. As may be known in FIG. 10, each pixel of the image sensor 10 may receive a wavelength in an IR frequency domain.

An initial compensation coefficient αi may be set based on [Equation 1] below.

$$\alpha_i = \frac{\int_{650}^{810} f_i(\lambda)d\lambda}{\int_{650}^{810} f_{IR}(\lambda)d\lambda}.$$ [Equation 1]

λ means the wavelength, fi(λ) refers to a light receiving rate of a spectrum which an i-th pixel receives in a predetermined wavelength, and fIR(λ) refers to a light receiving rate of a spectrum which an IR pixel receives in a predetermined wavelength. Accordingly, the initial compensation coefficient may be defined as a light receiving rate of the i-th pixel which is one of the R, G, and B pixels compared with the light receiving rate of the IR pixel in a predetermined wavelength. For example when αi is the initial compensation coefficient for the R pixel, αi corresponds to a value acquired by dividing an integral value of a first graph gR in the range of 650 to 810 nm by an integral value of a fourth graph gIR in the range of 650 to 810 nm.

In a third step (S830), average correction data for a first color patch is generated.

The average correction data for the first color patch includes generating correction data for each of first color data in the first image data and obtaining the average correction data by calculating an average value of the correction data.

Generating the correction data for each of the first color data in the first image data will be described below.

i-th correction data Iout_i_R1 for a first pixel R1 may be calculated based on [Equation 2] below.

$$Iout\_i\_R1 = (I\_R\_on) - ki \times (I\_IR\_on) \quad \text{[Equation 2]}$$

"ki" refers to an i-th compensation coefficient for generating i-th correction data. In other words, the initial compensation coefficient αi for the i-th pixel corresponds to "k1" and the correction data generated by using the initial compensation coefficient αi corresponds to the first correction data. The i-th correction data Iout_i_R1 for the first pixel is calculated by subtracting a product of the IR row data I_IR_on and the i-th compensation coefficient ki from the first row data I_R_on.

In the process of obtaining the compensation coefficient for the R pixel, the first pixel refers to any one pixel of n R pixels. The first row data and the IR row data of the first pixel will be described below in detail.

FIG. 11 is a view illustrating first image data.

Referring to FIG. 11, first image data IDATA1 refers to data obtained from each pixel when the MMC chart is photographed by using the image sensor 10 while the IR illumination is turned on. The first image data IDATA1 may include first color data IDATA1_C1 for the first patch C1 region of the MMC chart. The first image data IDATA1 includes first row data I_R_on and IR row data I_IR_on of each pixel.

The first color data IDATA1_C1 may include n R pixel data I_R1_on to I_Rn_on obtained from the R pixels, n G pixel data I_G1_on to I_Gn_on obtained from the G pixels, n B pixel data I_B1_on to I_Bn_on obtained from the B pixels, and n IR row data I_IR1_on to I_IRn_on obtained from the IR pixels.

The first row data I_R_on of the first pixel corresponds to "I_R1_on". Since the first pixel is the R pixel, the IR row data of the first pixel may not directly obtained. Accordingly, IR row data R_IR_on for the first pixel may be generated by interpolating data obtained by IR pixels adjacent to the first pixel. For example, the IR row data R_IR_on for the first pixel may be obtained by interpolating "R_IR1_on" and "R_IR1_on".

i-th average correction data Iout_i_R_avg1 of n R pixels in the first color data IDATA1_C1 corresponds to a value acquired by summing up the correction data for each R pixel and dividing a summing result by the number of pixels. In other words, the i-th average correction data Iout_i_R_avg1 may be calculated based on [Equation 3] below.

$$Iout\_i\_R\_avg1 = (Iout\_i\_R1 + Iout\_i\_R2 + \ldots + Iout\_i\_Rn)/n \quad \text{[Equation 3]}$$

"Iout_i_R2" represents i-th average correction data for a second R pixel and "Iout_i_Rn" represents i-th average correction data for an n-th R pixel.

In a fourth step (S840), average correction data in a plurality of color patches is generated. As illustrated in FIG. 9, when the average correction data includes 24 color patches, the average correction data for each of all color patches may be obtained as follows. In other words, by using [Equation 2] and [Equation 3], the average correction data of the second color patch to the average correction data of the 24-th color patch may be obtained.

In addition, based on [Equation 4] below, total average correction data Iout_avg for all color patches may be calculated.

$$Iout\_avg = (Iout\_R\_avg1 + Iout\_R\_avg2 + \ldots + Iout\_R\_avg24)/24 \quad \text{[Equation 4]}$$

"Iout_R_avg2" represents the average correction data for the first color patch C1 and "Iout_R_avg24" represents the average correction data for the 24-th color patch C24.

In a fifth step (S850), total average correction data Iout_avg is compared with a predetermined threshold. As the size of the threshold is smaller, finally generated correction data is closer to an actual color image, but a time of calculating a compensation coefficient k may be longer.

In a sixth step (S860), the corresponding compensation coefficient is determined as a compensation coefficient for an R color based on a fact that the total average correction data Iout_avg is less than the threshold. In addition, the correction data Iout_R for all R pixels is generated by using the corresponding compensation coefficient and the corresponding correction data is used as R data of the color image.

Similarly thereto, correction data Iout_G for G pixels and correction data Iout_B for B pixels may be generated and the color image may be obtained based on RGB correction data.

In a seventh step (S870), the compensation coefficient is changed based on a fact that the total average correction data Iout_avg is equal to or more than the threshold. The third step (S830) to the fifth step (S850) are repeated based on the changed compensation coefficient in the seventh step (S870).

A procedure of changing the compensation coefficient k may use a predetermined variable j. For example, an i+1-th compensation coefficient may be set by a product of the i-th compensation coefficient ki and the variable j or set by a sum of the i-th compensation coefficient ki and the variable j.

The above-described embodiments of the present disclosure may be implemented in code that a computer may read out of a recording medium. The computer-readable recording medium includes all types of recording devices storing data readable by a computer system. Examples of the computer-readable recording medium include hard disk drives (HDDs), solid state disks (SSDs), silicon disk drives (SDDs), read-only memories (ROMs), random access memories (RAMs), CD-ROMs, magnetic tapes, floppy disks, or optical data storage devices, or carrier wave-type implementations (e.g., transmissions over the Internet). Thus, the above description should be interpreted not as limiting in all aspects but as exemplary. The scope of the present disclosure should be determined by reasonable interpretations of the appended claims and all equivalents of the present disclosure belong to the scope of the present disclosure.

What is claimed is:

1. A method for obtaining an image using an image sensor including an infrared pixel and R, G, B color pixels, the method comprising:
   obtaining first image data by photographing a first color by means of the image sensor while an IR illumination is turned on;
   obtaining second image data by photographing the first color by means of the image sensor while an IR illumination is turned off;
   extracting, from the first image data, first row data obtained from a first pixel which is one of the R, G, B pixels of the image sensor;
   extracting, from the first image data, IR row data corresponding to an IR component of the first pixel; and
   generating correction data of the first pixel based on a difference between the first row data and the IR row data,
   wherein in the generating of the correction data, second row data obtained from the first pixel is extracted from the second image data and the correction data is generated so that a correction value which is in proportion to a deviation between the second row data and the correction data is less than a predetermined reference value.

2. The method of claim 1, wherein the obtaining of the IR row data of the first pixel includes interpolating IR data of two or more IR pixels adjacent to the first pixel.

3. The method of claim 1, wherein the generating of the correction data of the first pixel includes subtracting, from the first row data, a value corresponding to a product between a compensation coefficient and the second row data.

4. The method of claim 3, wherein the setting of the compensation coefficient includes
setting an i (i is a natural number)-th compensation coefficient,
generating i-th correction data by subtracting, from the first row data, a value corresponding to a product between the i-th compensation coefficient and the second row data, and
setting the i-th compensation coefficient as the compensation coefficient based on a fact that an i-th correction value which is in proportion to a deviation between the second row data and the i-th correction data is less than the reference value.

5. The method of claim 4, wherein the obtaining of the first and second image data further includes obtaining first and second image data for second to M (M is a natural number of 3 or more)-th colors.

6. The method of claim 5, wherein the setting of the compensation coefficient includes
calculating an i-th correction value of each of n (n is a natural number) pixels of the first color,
calculating an i-th average correction value for the n correction values,
obtaining an i-th total average correction value by calculating an average value for M i-th average correction values for the M colors, respectively, and
determining the i-th compensation coefficient as the compensation coefficient based on a fact that the i-th total average correction value is less than a predetermined threshold.

7. The method of claim 6, further comprising:
changing the i-th compensation coefficient based on a fact that the i-th total average correction value is equal to or more than the predetermined threshold.

8. The method of claim 4, wherein the first compensation coefficient is set to a ratio of an IR light receiving amount received by the first pixel which is one of R, G, and B pixels to an IR light receiving amount received by the IR pixel.

9. An apparatus for obtaining an image, the apparatus comprising:
an image sensor including R,G,B color pixels and an infrared pixel;
an IR illumination irradiating infrared light; and
a processor obtaining first image data by photographing a first color by means of the image sensor while the IR illumination is turned on, obtaining second image data by photographing the first color by means of the image sensor while an IR illumination is turned off, extracting, from the first image data, first row data obtained from a first pixel which is one of the R, G, B pixels of the image sensor and IR row data corresponding to an IR component of the first pixel, and generating correction data of the first pixel based on a difference between the row data and the IR row data,
wherein in the generating of the correction data, the processor extracts second row data obtained from the first pixel from the second image data and generates the correction data so that a correction value which is in proportion to a deviation between the second row data and the correction data is less than a predetermined reference value.

10. The apparatus of claim 9, wherein the processor obtains the IR row data of the first pixel by interpolating IR data of two or more IR pixels adjacent to the first pixel.

11. The apparatus of claim 9, wherein the processor generates the correction data of the first pixel by subtracting, from the first row data, a value corresponding to a product between a compensation coefficient and the second row data.

12. The apparatus of claim 11, wherein the processor sets an i (i is a natural number)-th compensation coefficient and generates i-th correction data by subtracting, from the first row data, a value corresponding to a product between the i-th compensation coefficient and the second row data, and sets the i-th compensation coefficient as the compensation coefficient based on a fact that an i-th correction value which is in proportion to a deviation between the second row data and the i-th correction data is less than the reference value.

13. The apparatus of claim 12, wherein the processor further obtains the first and second image data for second to M (M is a natural number of 3 or more)-th colors.

14. The apparatus of claim 13, wherein the processor calculates an i-th correction value of each of n (n is a natural number) pixels of the first color, calculates an i-th average correction value for the n correction values, obtains an i-th total average correction value by calculating an average value for M i-th average correction values for the M colors, respectively, and determines the i-th compensation coefficient as the compensation coefficient based on a fact that the i-th total average correction value is less than a predetermined threshold.

15. The apparatus of claim 12, wherein the processor sets the first compensation coefficient to a ratio of an IR light receiving amount received by the first pixel which is one of R, G, and B pixels to an IR light receiving amount received by the IR pixel.

* * * * *